Patented Mar. 31, 1936

2,036,130

UNITED STATES PATENT OFFICE 2,036,130

ASPHALTIC PAVING COMPOSITION AND METHOD OF MAKING SAME

James William Fraser, Cleveland, Ohio

No Drawing. Application December 3, 1934, Serial No. 755,832

5 Claims. (Cl. 106—31)

This invention relates to a composition of paving material, particularly an improved material for asphaltic concrete pavements, and to the method of making the same.

As pointed out in my prior Patent No. 1,757,661, granted May 6, 1930, standard specifications for asphaltic concrete pavements have fixed the penetration of the asphaltic cement which was generally controlled by the use of a specified flux. The asphaltic cement used comprises two groups of hydrocarbons, of which the lighter group termed malthenes determines the tackiness and binding qualities of the cement. The heavier group is called the asphaltenes. Natural malthas, such as the bitumen contained in Kentucky rock sands, are viscous liquid or semi-liquid bitumens which have the property of hardening very rapidly when heated, and for this reason do not make a satisfactory flux for asphaltic cement.

It has been generally accepted that such natural malthas are not suitable for making pavements because of the hardening tendency and because the bitumens are normally too soft for use as a cement. In accordance with the method described in my prior patent, natural malthas lower in fixed carbon and higher in malthenes than ordinary asphaltic cement are utilized by mixing the same with asphaltic cement while avoiding prolonged heating to such a degree as would harden the bitumen. In this manner, the resulting bitumen is stickier and self-healing on account of the higher proportion of the malthene group of hydrocarbons. The present invention relates to an improvement in the method of making a paving mixture as described in said patent by which an improved asphaltic concrete or mixture is obtained.

A pavement made from the improved concrete has desirable qualities, being long-lived, durable and self-healing.

As an illustration of a preferred manner of carrying out the invention, I have discovered that I can heat crushed stone or the like, such as limestone, trap rock, gravel, coarse sand or slag to an elevated temperature of about 350° F., add cold Kentucky rock sand to the hot stone in a mixer, then add the necessary hot asphaltic cement as or just before the malthas of the Kentucky rock sand begin to volatilize. At temperatures above about 300° F. the malthas are driven off from the rock and, if subjected to such temperatures for extended periods, are cracked or broken down into hard bitumens which are of no value as a binder. The heating of the rock asphalt sufficient to drive off the malthas or a considerable portion thereof from the rock however is desirable as it makes it possible to utilize "lean" rock asphalt containing as little as 3% or 4% malthas. This heating of the rock asphalt drives out water, softens and initiates the volatilization but it is not heated long enough to injure the desirable qualities of the maltha. I have found that undue loss and cracking of the malthas is obviated, by accurate temperature control and partially by entrapping the same in the added asphaltic cement, and the resulting product is a new asphaltic concrete having more desirable properties in regard to durability, strength, elasticity and power to absorb impact than are obtained by prior processes using either standard asphaltic cement or natural malthas. The asphalt cementing medium resulting from the described process possesses more adhesiveness and ductility than standard asphalt cement.

The proportions of rock and binder are such as to produce the desired voidage in accordance with accepted practice which may vary somewhat under different conditions. The ratio of the maltha of the Kentucky rock sand or other source of natural maltha to the asphaltic cement is an important factor and thus where the percentage of maltha in the sand varies, this should be taken into account in estimating the proportion of sand.

By experiment I have discovered that the ratio of the maltha of average Kentucky rock sand to the standard asphaltic cement that produces the most desirable bituminous material for paving mixtures is one part of maltha to four parts of cement. These proportions may be varied with satisfactory results between about 1:3 and 1:5 by weight, and variations in the character of the maltha or of the asphaltic cement, both of which are complex hydrocarbon compounds, may require corresponding changes in the proportions used which may be readily determined by those skilled in the art.

The mastic produced by the ground sand rock and its contained maltha, with the added asphaltic cement in the proper proportions has a high cementing value and substantially fills the voids and binds together the hot crushed stone, slag, gravel, or coarse sand, the voidage usually not exceeding 44%. The combination of the malthas and the asphaltic cement produces a more desirable and effective cementing medium than either material when used alone. The resulting mixture or concrete is particularly suitable for pavements, floors and similar uses, and is adapted for any purpose for which an asphaltic concrete is suitable.

The essence of the invention includes combining hot crushed stone, or slag, or gravel, or coarse sand, cold natural rock asphalt or cold sand rock asphalt, such as Kentucky rock sand, after grinding, with a hot asphaltic cement in such a manner that a proper mixture is obtained without substantial evaporation of the malthas of the natural rock or sand rock and in such proportions that the binder possesses improved qualities of durability and ductility as compared with standard asphaltic cement.

The ground rock asphalt or rock sand ordinarily contains some moisture, and upon adding the same to the hot crushed stone, care should be taken to allow sufficient time in the mixer so that the moisture is driven off by the heating of the sand before the asphaltic cement is added. The water vapor is driven off as steam and the appearance of the steam serves as an indication that the temperature of the sand has been raised to the point necessary to dry the material.

As indicated above, various changes in the preferred process described in detail may be made without departing from the scope of the invention and therefore I do not limit myself to what is described in the specification, but only as indicated in the appended claims.

I claim:

1. The process of making an asphaltic paving composition comprising, heating a mineral aggregate to an elevated temperature, adding and mixing a maltha containing rock sand therewith, and just before the maltha in the rock sand begins to volatilize adding and thoroughly mixing asphaltic cement therewith.

2. The process of making an asphaltic paving composition comprising, heating a mineral aggregate to an elevated temperature of about 350 degrees F., adding and mixing cold maltha containing rock sand therewith, and just before the maltha in the rock sand begins to volatilize adding and thoroughly mixing hot asphaltic cement therewith, the maltha in the rock sand and asphaltic cement being in the proportions of 1 to 3 to 1 to 5 by weight.

3. An asphaltic paving composition comprising thoroughly mixed mineral aggregate, maltha containing rock sand and asphaltic cement, the quantity of cement being from three to five times that of the maltha contained in the rock sand.

4. An asphaltic paving composition comprising thoroughly mixed mineral aggregate, maltha containing rock sand and asphaltic cement, the quantity of cement being approximately four times that of the maltha contained in the rock sand.

5. Asphaltic concrete comprising mineral aggregate and a binder, said binder consisting of bitumen containing substantially four parts of asphaltic cement to one part of maltha, the maltha being thoroughly commingled with the asphaltic cement.

JAMES WILLIAM FRASER.